US008892880B2

(12) United States Patent
Malzahn et al.

(10) Patent No.: US 8,892,880 B2
(45) Date of Patent: Nov. 18, 2014

(54) SYSTEM AND METHOD FOR OBTAINING AN AUTHORIZATION KEY TO USE A PRODUCT

(75) Inventors: Ralf Malzahn, Seevetal (DE); Hauke Meyn, Krempermoor (DE)

(73) Assignee: NXP B.V., Eindhoven (NL)

( * ) Notice: Subject to any disclaimer, the term of this patent is extended or adjusted under 35 U.S.C. 154(b) by 710 days.

(21) Appl. No.: 12/914,900

(22) Filed: Oct. 28, 2010

(65) Prior Publication Data
US 2011/0107095 A1    May 5, 2011

(30) Foreign Application Priority Data

Oct. 30, 2009 (EP) .................................. 09174704

(51) Int. Cl.
*H04L 29/06* (2006.01)
*H04L 9/32* (2006.01)
*G06F 21/10* (2013.01)
*G06F 21/34* (2013.01)

(52) U.S. Cl.
CPC ............... *G06F 21/10* (2013.01); *G06F 21/34* (2013.01)
USPC ........... 713/168; 713/150; 713/156; 713/164; 713/169; 713/170; 713/172; 713/175; 713/176

(58) Field of Classification Search
CPC .. G06Q 20/341; H04L 63/0853; G06F 21/34; G06F 21/10; G06F 21/62; G06F 21/6218
USPC ......... 713/150, 156, 164, 168–170, 175–176, 713/172
See application file for complete search history.

(56) References Cited

U.S. PATENT DOCUMENTS

| 5,892,900 | A  | * | 4/1999 | Ginter et al. ................... 726/26 |
| 6,272,631 | B1 | * | 8/2001 | Thomlinson et al. ......... 713/155 |
| 2002/0029347 | A1 | * | 3/2002 | Edelman ...................... 713/193 |
| 2003/0024980 | A1 | * | 2/2003 | Everett et al. ................ 235/380 |
| 2003/0149872 | A1 | * | 8/2003 | Harrison et al. ............. 713/155 |
| 2009/0276829 | A1 | * | 11/2009 | Sela et al. ....................... 726/2 |

FOREIGN PATENT DOCUMENTS

| WO | 2007/040552 A1 | 4/2007 |
| WO | 2008/095193 A1 | 8/2008 |

OTHER PUBLICATIONS

Extended European Search Report for Patent Appln. No. EP09174704.8 (Dec. 30, 2009).

* cited by examiner

*Primary Examiner* — Jung Kim
*Assistant Examiner* — John Elmore

(57) ABSTRACT

A system and method for obtaining an authorization key to use a product utilizes a secured product identification code, which includes a serial number and at least one code that is generated based on a cryptographic algorithm.

12 Claims, 4 Drawing Sheets

SYSTEM AND METHOD FOR OBTAINING AN AUTHORIZATION KEY TO USE A PRODUCT

This application claims the priority under 35 U.S.C. §119 of European patent application no. 09174704.8, filed on Oct. 30, 2009, the contents of which are incorporated by reference herein.

BACKGROUND

Embodiments of the invention relate generally to product identification and authorization systems and, more particularly, to a system and method for obtaining an authorization key to use a product.

In a conventional product identification and authorization system, a product is identified by a serial number and an authorization key to use the product is obtained from a product manufacturer using the serial number of the product. However, serial numbers of the same category of products are usually similar. For example, serial numbers of the same category of products may be sequential numbers. Thus, an imposter may be able to use a serial number of one product to guess the serial numbers of other products in the same category and to obtain authorization keys to use the products from the product manufacturer, which potentially prevents the real owners of the products from getting the authorization keys to use the products. Therefore, there is a need to ensure authenticity when a serial number of a product is used to obtain an authorization key to use the product from a product manufacturer.

BRIEF DESCRIPTION OF THE DRAWINGS

Throughout the description, similar reference numbers may be used to identify similar elements.

DETAILED DESCRIPTION

Figure 1:
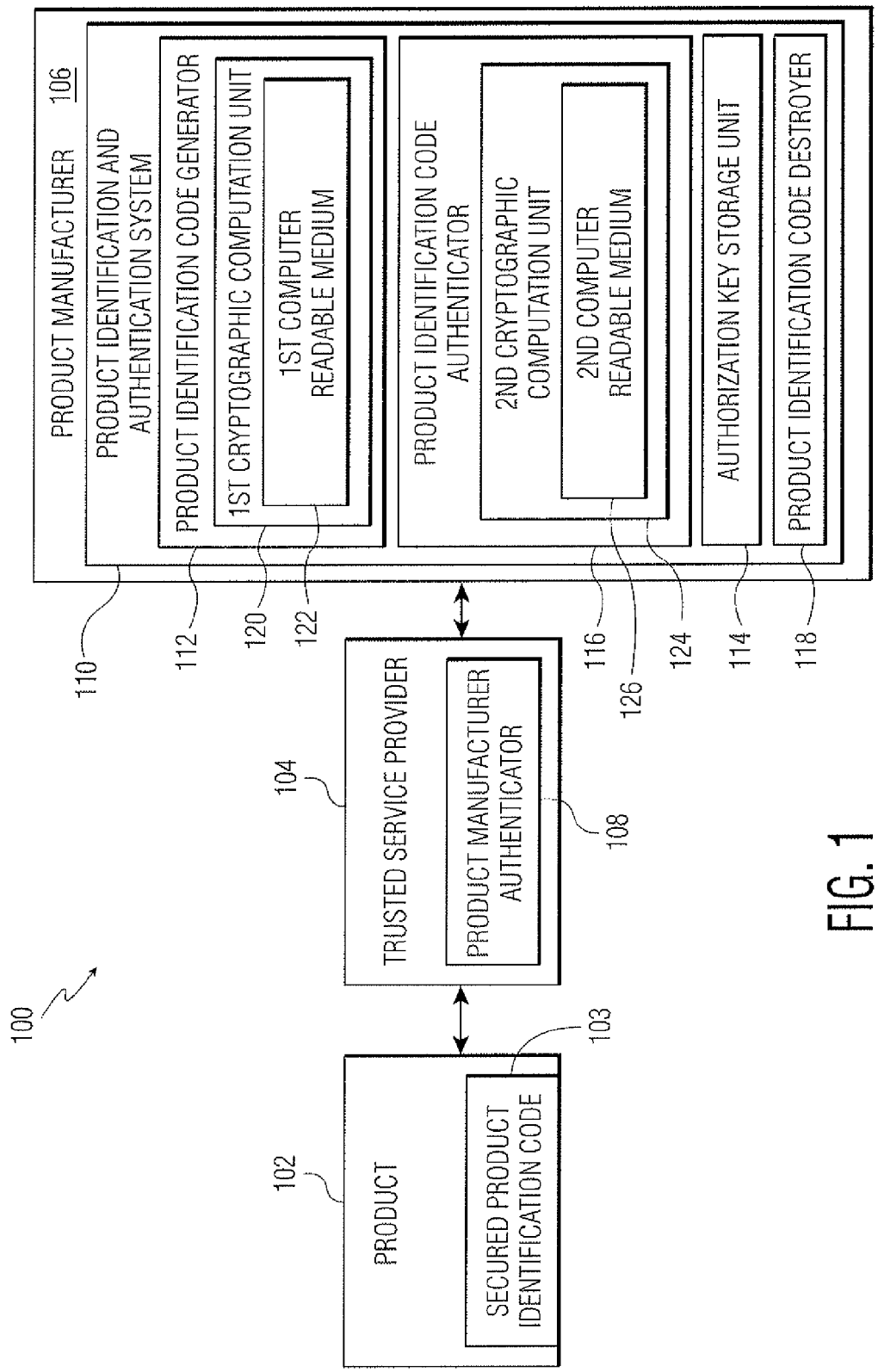
FIG. 1 is a schematic block diagram of a system for obtaining an authorization key to use a product in accordance with an embodiment of the invention.

According to an aspect of the present invention, there is provided a system and method for obtaining an authorization key to use a product utilizes a secured product identification code, which includes a serial number and at least one code that is generated based on a cryptographic algorithm.

In an embodiment, there is provided a method for obtaining an authorization key to use a product includes providing a secured product identification code to the product by a product manufacturer, where the secured product identification code comprises a product serial number and at least one cryptographic code that is generated based on a cryptographic algorithm, extracting the secured product identification code from the product by a trusted service provider of the product and transmitting the secured product identification code from the trusted service provider to the product manufacturer and authenticating the secured product identification code using the cryptographic algorithm by the product manufacturer and transmitting a copy of the authorization key from the product manufacturer to the trusted service provider after the authenticating by the product manufacturer.

In an embodiment, there is provided a method for obtaining an authorization key to use a smart card integrated circuit (IC) involves providing a secured smart card IC identification code to the smart card IC by a smart card IC manufacturer, where the secured smart card IC identification code comprises a smart card IC serial number and at least one cryptographic code that is generated based on a cryptographic algorithm, extracting the secured smart card IC identification code from the smart card IC by a trusted service provider of the smart card IC and transmitting the secured smart card IC identification code from the trusted service provider to the smart card IC manufacturer and authenticating the secured smart card IC identification code using the cryptographic algorithm by the smart card IC manufacturer and transmitting a copy of the authorization key from the smart card IC manufacturer to the trusted service provider after the authenticating by the smart card IC manufacturer.

In an embodiment, there is provided a product identification and authentication system for a product manufacturer that produces a product includes a product identification code generator and a product identification code authenticator. The product identification code generator is configured to generate a secured product identification code for the product, where the secured product identification code includes a product serial number and at least one cryptographic code that is generated based on a cryptographic algorithm. The product identification code authenticator is configured to authenticate the secured product identification code that is received from a trusted service provider using the cryptographic algorithm and to transmit a copy of an authorization key to use the product to the trusted service provider after authentication.

Other aspects and advantages of embodiments in accordance with the invention will become apparent from the following description, taken in conjunction with the accompanying drawings, illustrated by way of example of the principles of the invention.

FIG. 1 is a schematic block diagram of a system 100 for obtaining an authorization key to use a product 102 in accordance with an embodiment of the invention. As shown in FIG. 1, the system for obtaining the authorization key to use the product includes the product, a trusted service provider 104 of the product and a product manufacturer 106 that produced the product.

In the embodiment of FIG. 1, the product 102 can be software that is stored in a computer readable medium, hardware or a combination of software that is stored in a computer readable medium and hardware. In an embodiment, the product is a smart card IC, which is a tamper resistant system on chip (SoC) that is attached to and removable from or is integrated within a consumer device such as a mobile phone, a personal digital assistance (PDA), a laptop computer, or a personal computer (PC). In another embodiment, the product is a secured element. In an example, the secured element is a smart card IC with a fully secured and initialized operating system having a unique identifier and a chip individual platform management key, which is integrated using a defined trusted process. In another example, the secured element is a small single chip device with special security features that is built into a bigger electronic device and the security level of the secured element can be certified by an independent entity according to industry standardized criteria, such as common criteria certification.

The product 102 has a secured product identification code 103 that is provided by the product manufacturer 106. In an embodiment, the secured product identification code is embedded within at least one component of the product. For example, the product includes memory (not shown) that stores the secured product identification code. In another embodiment, the secured product identification code is not embedded within any component of the product. For example, the secured product identification code is located on the package (not shown) of the product.

The trusted service provider 104 of the product 102 may be a computer, a person or a person that is equipped with a computer. The trusted service provider of the product is configured to extract the secured product identification code 103 from the product and to transmit the secured product identification code to the product manufacturer 106. In an embodiment, the trusted service provider is connected to the product through a data connection and extracts the secured product identification code from memory of the product that stores the secured product identification code through the data connection. In another embodiment, the trusted service provider reads the secured product identification code from the package of the product.

In the embodiment of FIG. 1, the trusted service provider 104 includes an optional product manufacturer authenticator 108, which is configured to verify whether a target product manufacturer is the actual product manufacturer 106 that produced the product 102. For example, the trusted service provider requests a target product manufacturer to provide a manufacturer key and verify the manufacturer key provided by the target product manufacturer using information stored in the product, such as a product key embedded in the product during the production process. In an embodiment, only after the optional product manufacturer authenticator confirms that the target product manufacturer is the product manufacturer that produced the product, the trusted service provider transmits the secured product identification code of the product to the target product manufacturer.

The product manufacturer 106 that produced the product 102 includes a product identification and authentication system 110, which includes a product identification code generator 112, an authorization key storage unit 114, a product identification code authenticator 116, and an optional product identification code destroyer 118. The product identification code generator includes a first cryptographic computation unit 120 that includes a first computer readable medium 122. The product identification code authenticator includes a second cryptographic computation unit 124 that includes a second computer readable medium 126. Although the first and second computer readable mediums are shown in the embodiment of FIG. 1 as separate from other components of the product identification and authentication system, at least one of the first and second computer readable mediums may be integrated within another component of the product identification and authentication system in other embodiments.

Figure 2:
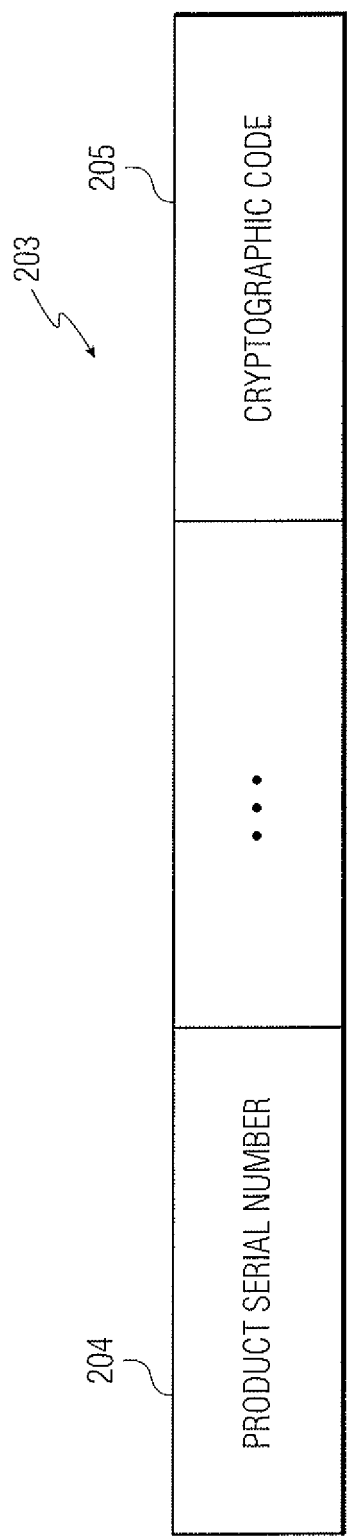
FIG. 2 depicts an exemplary secured product identification code that can be used in the system of FIG. 1.

The product identification code generator 112 is configured to generate the secured product identification code 103 of the product 102. An exemplary secured product identification code 203 is depicted in FIG. 2. As shown in FIG. 2, the exemplary secured product identification code includes a product serial number 204 and at least one cryptographic code 205. The product serial number includes at least one number, character and/or symbol and can include any number of bytes. In an embodiment, the product serial number is a series of numbers, characters and/or symbols. For example, the product serial number is a number that is defined in ISO 14443-3 and includes four, seven or eleven bytes.

In an embodiment, the product serial number 204 includes sufficient identification information about the product 102 so that the product can be individually identified through the product serial number only. For example, the product serial number is a unique number, such as one of a series of sequential numbers. In another example, the product serial number is selected from a range of serial numbers that are exclusively assigned to the product manufacturer 106.

In an embodiment, the secured product identification code 103 includes more than one cryptographic code, where each cryptographic code includes information that is used for a unique purpose. For example, the secured product identification code includes a first cryptographic code and a second cryptographic code, where the first cryptographic code includes information that is used for identifying the product manufacturer and the second cryptographic code includes information that is used for identifying the product.

In an embodiment, the cryptographic code 205 is derived from the product serial number 204. For example, the cryptographic code may be a checksum, a signature or a hash value of the product serial number. The checksum may be generated based on the product serial number using a cyclic redundancy check (CRC) algorithm such as CRC-32. The signature may be generated based on the product serial number using the Digital Signature Algorithm (DSA) such as Federal Information Processing Standards (FIPS) 186-3. The hash value may be generated based on the product serial number using cryptographic hash algorithms such as Message-Digest algorithm 5 (MD5) and Secure Hash Algorithm (SHA), in particular the SHA-2 family. In another embodiment, a cryptographic code is a random value and is not derived from the product serial number.

In an embodiment, the cryptographic code 205 includes information about the product manufacturer 106. For example, the cryptographic code is generated by the product manufacturer using a private encryption/decryption key of the product manufacturer. The product manufacturer releases a corresponding public encryption/decryption key of the private encryption/decryption key. The trusted service provider 104 can verify the cryptographic code 205 using the public encryption/decryption key of the product manufacturer to check whether the product manufacturer produced the cryptographic code.

In an embodiment, the product serial number 204 and the cryptographic code 205 are transmitted from the trusted service provider 104 to the product manufacturer 106 independently. In another embodiment, the product serial number and the cryptographic code are transmitted together from the trusted service provider to the product manufacturer.

Referring back to the embodiment of FIG. 1, the first cryptographic computation unit 120 is configured to generate the cryptographic code 205 based on a cryptographic algorithm that is stored in the first computer readable medium 122. The cryptographic algorithm may be an asymmetric cryptographic algorithm or a symmetric cryptographic algorithm. In an embodiment, the cryptographic algorithm is only known to the product manufacturer 106. In other words, the cryptographic algorithm is not known to any other entity except the product manufacturer. In an embodiment, the cryptographic algorithm has at least one parameter such as an encryption key, which is only known to the product manufacturer.

The authorization key storage unit 114 is configured to store the authorization key to use the product 102. The authorization key to use the product may also be used for secure communication using the product.

The product identification code authenticator 116 is configured to authenticate the secured product identification code 103 that is received from the trusted service provider 104 using the second cryptographic computation unit 124 and a cryptographic algorithm that is stored in the second computer readable medium 126. The cryptographic algorithm stored in the second computer readable medium is related to the cryptographic algorithm stored in the first computer readable medium 122. In an embodiment, the cryptographic algorithm stored in the second computer readable medium is the same cryptographic algorithm stored in the first computer readable medium. In another embodiment, the cryptographic algorithm stored in the second computer readable medium is derived from the cryptographic algorithm stored in the first computer readable medium. For example, the cryptographic algorithm stored in the first computer readable medium is used for encryption and the cryptographic algorithm stored in the second computer readable medium is used for decryption. After the product identification code authenticator confirms the product identification code that is received from the trusted service provider is authentic, the product manufacturer 106 transmits a copy of the authorization key to use the product 102 to the trusted service provider.

The optional product identification code destroyer 118 is configured to destroy the authorization key to use the product 102 after the product manufacturer 106 transmits a copy of the authorization key to use the product to the trusted service provider 104. By destroying the authorization key to use the product after the copy of the authorization key to use the product is transmitted to the first trusted service provider who requests for the authorization key to use the product with an authentic product identification code, the product manufacturer can limit the liability in case that the authorization key is leaked to the public by a third party.

In an exemplary operation, the product manufacturer 106 provides the secured product identification code 103 to the product 102. The trusted service provider 104 of the product extracts the secured product identification code from the product and transmits the secured product identification code to the product manufacturer. The product manufacturer then authenticates the secured product identification code that is received from the trusted service provider and transmits a copy of an authorization key to use the product that is stored in the authorization key storage unit 114 to the trusted service provider after the authentication confirms the product identification code that is received from the trusted service provider is authentic. After the product manufacturer transmits the copy of the authorization key to use the product to the trusted service provider, the product identification code destroyer 108 destroys the authorization key to use the product that is stored in the authorization key storage unit.

Figure 3:
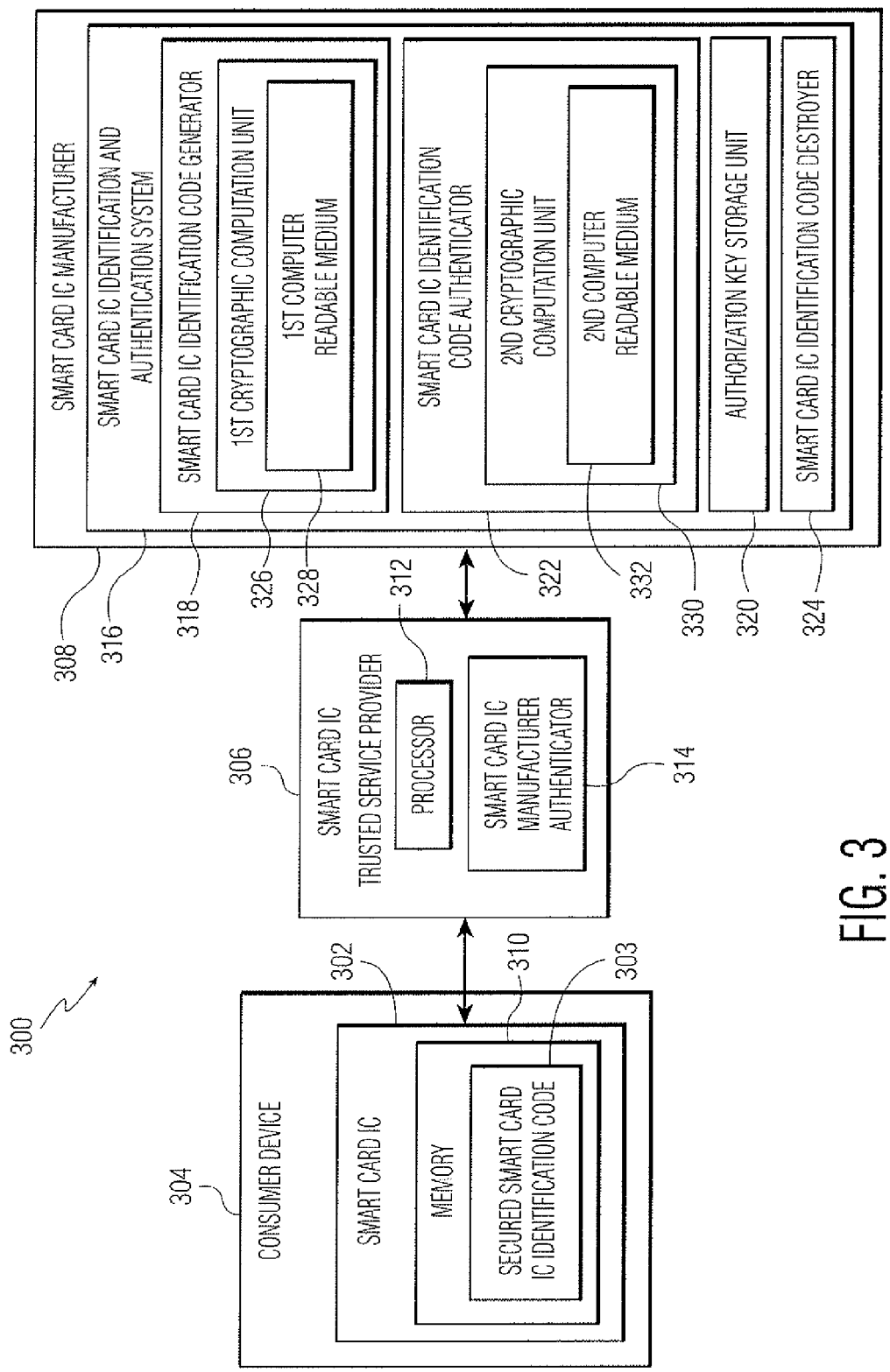
FIG. 3 is a schematic block diagram of a system for obtaining an authorization key to use a smart card IC in accordance with an embodiment of the invention.

FIG. 3 is a schematic block diagram of a system 300 for obtaining an authorization key to use a smart card IC 302 in accordance with an embodiment of the invention. As shown in FIG. 3, the system includes the smart card IC that is integrated within a consumer device 304, a smart card IC trusted service provider 306 and a smart card IC manufacturer 308. The consumer device may be a mobile phone, a personal digital assistance (PDA), a laptop computer or a personal computer (PC). Although the smart card IC is shown as integrated within the consumer device in FIG. 3, the smart card IC can be removable from the consumer device.

The system 300 described with reference to FIG. 3 is an example of the system 100 described with reference to FIG. 1 that is dedicated to smart card IC. Because the system described with reference to FIG. 3 is an example of the system described with reference to FIG. 1, the previous description of various components of the system described with reference to FIG. 1 also applies to the components of the system described with reference to FIG. 3.

In the embodiment of FIG. 3, the smart card IC 302 has memory 310 that stores a secured smart card IC identification code 303, which is provided by the smart card IC manufacturer 308. In other embodiments, the secured smart card IC identification code is not embedded within any component of the smart card IC or the consumer device 304. For example, the secured smart card IC identification code is located on the package (not shown) of the smart card IC or the consumer device.

The smart card IC trusted service provider 306 includes a processor 312 that is configured to install at least one application to the smart card IC 302. In an embodiment, the smart card IC trusted service provider is contracted by a party who wants to install at least one application into the smart card IC. In another embodiment, the smart card IC trusted service provider is directly contracted by a consumer who wants to install at least one application into the smart card IC. The smart card IC trusted service provider is also configured to extract the secured smart card IC identification code from the smart card IC and to transmit the secured smart card IC identification code to the smart card IC manufacturer 308.

In the embodiment of FIG. 3, the smart card IC trusted service provider 306 includes an optional smart card IC manufacturer authenticator 314, which is configured to verify whether a target smart card IC manufacturer is the smart card IC manufacturer 308 that produced the smart card IC.

The smart card IC manufacturer 308 that produced the smart card IC 302 includes a smart card IC identification and authentication system 316, which includes a smart card IC identification code generator 318, an authorization key storage unit 320, a smart card IC identification code authenticator 322, and an optional smart card IC identification code destroyer 324. The smart card IC manufacturer initializes the smart card IC and inserts cryptographic keys to secure the smart card IC. Because final applications and related managing entity are not known to the smart card IC manufacturer during the production process, there are no specific bonding on cryptographic keys, applications and data of the smart card IC during the production process.

The smart card IC identification code generator 318 includes a first cryptographic computation unit 326 that includes a first computer readable medium 328. The smart card IC identification code generator is configured to generate the secured smart card IC identification code 303 of the smart card IC 302. The secured product identification code includes a smart card IC serial number and at least one smart card IC cryptographic code, which is generated by the first cryptographic computation unit based on a cryptographic algorithm that is stored in the first computer readable medium. The cryptographic algorithm may be an asymmetric cryptographic algorithm or a symmetric cryptographic algorithm. In an embodiment, the cryptographic algorithm is only known to the smart card IC manufacturer 308. In other words, the cryptographic algorithm is not known to any other entity except the smart card IC manufacturer. In an embodiment, the cryptographic algorithm has at least one parameter such as an encryption key, which is only known to the smart card IC manufacturer.

The authorization key storage unit 320 is configured to store the authorization key to use the smart card IC 302. The authorization key to use the product may also be used for secure communication using the smart card IC.

The smart card IC identification code authenticator 322 includes a second cryptographic computation unit 330 that includes a second computer readable medium 332. The smart card IC identification code authenticator is configured to authenticate the secured smart card IC identification code 303 that is received from the smart card IC trusted service provider 306 using a cryptographic algorithm that is stored in the second computer readable medium. The cryptographic algorithm stored in the second computer readable medium is related to the cryptographic algorithm stored in the first computer readable medium 328. In an embodiment, the cryptographic algorithm stored in the second computer readable medium is the same cryptographic algorithm stored in the first computer readable medium. In another embodiment, the cryptographic algorithm stored in the second computer readable medium is derived from the cryptographic algorithm stored in the first computer readable medium. For example, the cryptographic algorithm stored in the first computer readable medium is used for encryption and the cryptographic algorithm stored in the second computer readable medium is used for decryption. After the smart card IC identification code authenticator confirms the smart card IC identification code that is received from the smart card IC trusted service provider is authentic, the smart card IC manufacturer 308 transmits a copy of the authorization key to use the smart card IC 302 to the smart card IC trusted service provider.

The optional smart card IC identification code destroyer 324 is configured to destroy the authorization key to use the smart card IC 302 that is stored in the authorization key storage unit 320 after the smart card IC manufacturer 308 transmits a copy of the authorization key to use the smart card IC to the smart card IC trusted service provider 306. By destroying the authorization key to use the smart card IC after the copy of the authorization key to use the smart card IC is transmitted to the first trusted service provider who requests for the authorization key to use the smart card IC with an authentic smart card identification code, the smart card IC manufacturer can limit the liability in case that the authorization key is leaked to the public by a third party.

In an exemplary operation, the smart card IC manufacturer 308 provides the secured smart card IC identification code 303 to the smart card IC 302. The smart card IC trusted service provider 306 extracts the secured smart card IC identification code from the smart card IC and transmits the secured smart card IC identification code to the smart card IC manufacturer. The smart card IC manufacturer authenticates the secured smart card IC identification code that is received from the smart card IC trusted service provider and transmits a copy of an authorization key to use the smart card IC to the smart card IC trusted service provider after the authentication confirms the smart card IC identification code that is received from the smart card IC trusted service provider is authentic. The smart card IC trusted service provider installs at least one application to the smart card IC with the authorization key to use the smart card IC. After the smart card IC manufacturer transmits the copy of the authorization key, the smart card IC identification code destroyer 324 destroys the authorization key to use the smart card IC that is stored in the authorization key storage unit 320.

Figure 4:
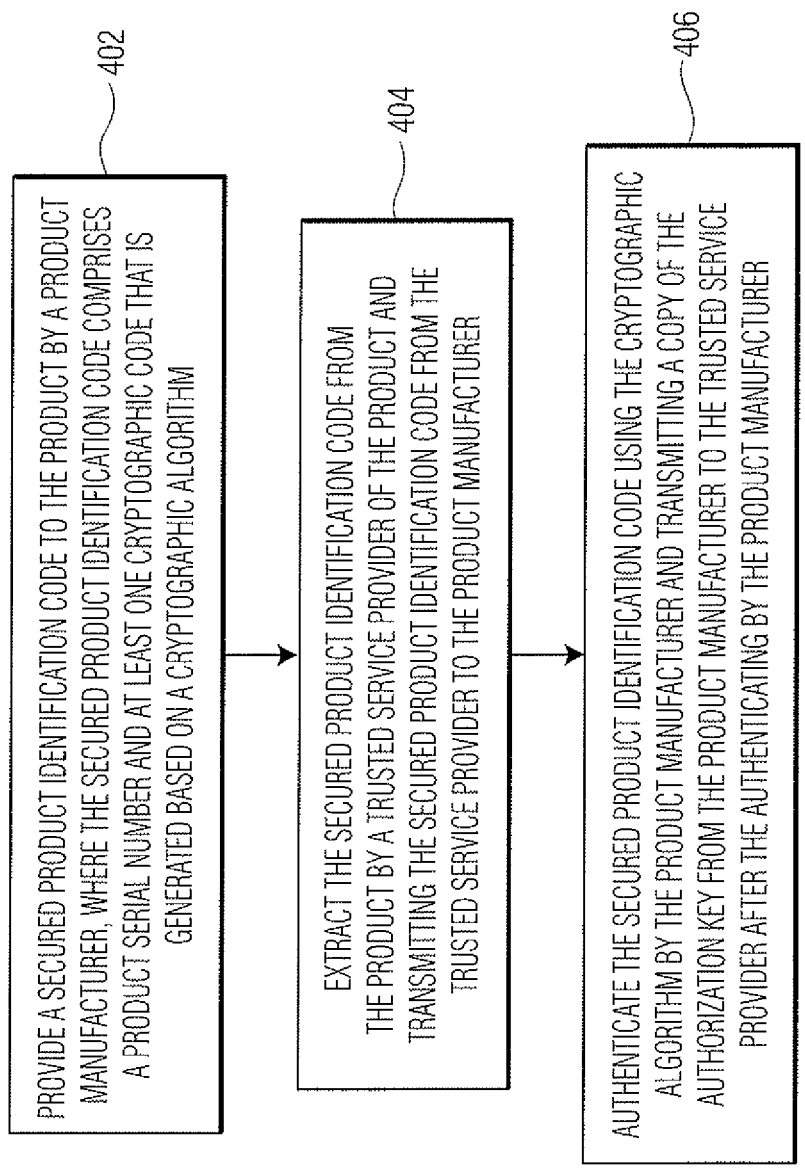
FIG. 4 is a process flow diagram of a method for obtaining an authorization key to use a product in accordance with an embodiment of the invention.

FIG. 4 is a process flow diagram of a method for obtaining an authorization key to use a product in accordance with an embodiment of the invention. At block 402, a secured product identification code is provided to the product by a product manufacturer, where the secured product identification code comprises a product serial number and at least one cryptographic code that is generated based on a cryptographic algorithm. At block 404, the secured product identification code is extracted from the product by a trusted service provider of the product and the secured product identification code is transmitted from the trusted service provider of the product to the product manufacturer. At block 406, the secured product identification code is authenticated using the cryptographic algorithm by the product manufacturer and a copy of the authorization key is transmitted from the product manufacturer to the trusted service provider after the authenticating by the product manufacturer.

There has been disclosed a method for obtaining an authorization key to use a smart card integrated circuit (IC), the method comprising: providing a secured smart card IC identification code to the smart card IC by a smart card IC manufacturer, wherein the secured smart card IC identification code comprises a smart card IC serial number and at least one cryptographic code that is generated based on a cryptographic algorithm; extracting the secured smart card IC identification code from the smart card IC by a trusted service provider of the smart card IC and transmitting the secured smart card IC identification code from the trusted service provider to the smart card IC manufacturer; and authenticating the secured smart card IC identification code using the cryptographic algorithm by the smart card IC manufacturer and transmitting a copy of the authorization key from the smart card IC manufacturer to the trusted service provider after the authenticating by the smart card IC manufacturer.

In the method, it may be that the cryptographic algorithm is only known to the product manufacturer.

The method may further comprising installing at least one application to the smart card IC with the authorization key to use the smart card IC by the smart card IC trusted service provider.

Although specific embodiments in accordance with the invention have been described or depicted herein, other embodiments of the invention may include fewer or more components to implement less or more functionality. Furthermore, the invention is not to be limited to the specific forms or arrangements of parts so described and depicted. The scope of the invention is to be defined by the claims appended hereto and their equivalents.

The invention claimed is:

1. A method for obtaining an authorization key to use a smart card integrated circuit (IC), the method comprising:
   providing a secured smart card IC identification code to the smart card IC by a smart card IC manufacturer, wherein the secured smart card IC identification code comprises a smart card IC serial number and at least one cryptographic code that is derived from the smart card serial number using a cryptographic algorithm, wherein the cryptographic code includes information about the smart card IC manufacturer;
   extracting the secured smart card IC identification code from the smart card IC by a trusted service provider, the trusted service provider comprising a processor external to the smart card IC and its packaging; transmitting the secured smart card IC identification code from the trusted service provider to the smart card IC manufacturer over a data connection; and
   authenticating the secured smart card IC identification code using the cryptographic algorithm by the smart card IC manufacturer and transmitting a copy of the authorization key from the smart card IC manufacturer to the trusted service provider over the data connection after the authenticating by the smart card IC manufacturer, wherein transmitting the secured smart card IC identification code to the smart card IC manufacturer over a data connection comprises transmitting the smart card IC serial number from the trusted service provider to the smart card IC manufacturer and where transmitting the smart card IC serial number is independent of transmitting the at least one cryptographic code.

2. The method of claim 1, wherein the cryptographic algorithm is only known to the smart card IC manufacturer.

3. The method of claim 1, wherein the cryptographic algorithm has at least one parameter that is only known to the smart card IC manufacturer.

4. The method of claim 1, wherein the smart card IC serial number includes sufficient identification information about the smart card IC so that the smart card IC can be individually identified through the smart card IC serial number only.

5. The method of claim 1, wherein the secured smart card IC identification code includes more than one cryptographic code, wherein each cryptographic code includes information that is used for a unique purpose.

6. The method of claim 1, wherein the cryptographic code of the secured smart card IC identification code is a checksum, a signature or a hash value of the smart card IC serial number.

7. The method of claim 1 further comprising destroying the authorization key to use the smart card IC by the smart card IC manufacturer after transmitting the copy of the authorization key to the trusted service provider.

8. The method of claim 1, wherein the transmitting the secured smart card IC identification code to the smart card IC manufacturer comprises choosing a target smart card IC manufacturer and verifying whether the target smart card IC manufacturer is the smart card IC manufacturer that produced the smart card IC.

9. The method of claim 8, wherein the transmitting the secured smart card IC identification code to the smart card IC manufacturer further comprises transmitting the secured smart card IC identification code to the target smart card IC manufacturer only after the target smart card IC manufacturer is confirmed to be the smart card IC manufacturer that produced the smart card IC.

10. The method of claim 1 further comprising
installation by the smart card IC trusted service provider of at least one application to the smart card IC with the authorization key to use the smart card IC by the smart card IC trusted service provider.

11. A smart card IC identification and authentication system for a smart card IC manufacturer that produces a smart card IC, the smart card IC identification system comprising:
a smart card IC identification code generator configured to generate a secured smart card IC identification code for the smart card IC, wherein the secured smart card IC identification code includes a smart card IC serial number and at least one cryptographic code that is derived from the smart card serial number using a cryptographic algorithm, wherein the cryptographic code includes information about the smart card IC manufacturer; and
a smart card IC identification code authenticator configured to authenticate the secured smart card IC identification code that is received from a trusted service provider, comprising a processor external to the smart card IC and its packaging, using the cryptographic algorithm and to transmit a copy of an authorization key to use the smart card IC to the trusted service provider after authentication, wherein the smart card IC identification and authentication system is configured for receiving the secured smart card IC identification code from the trusted service provider over the data connection where receiving the secured smart card IC identification code includes receiving the smart card IC serial number from the trusted service provider and receiving the at least one cryptographic code from the trusted service provider and receiving the smart card IC serial number is independent from receiving the at least one cryptographic code.

12. The smart card IC identification and authentication system of claim 11 further comprising a smart card IC identification code destroyer configured to destroy the authorization key to use the smart card IC after the copy of the authorization key to use the smart card IC is transmitted to the trusted service provider.

\* \* \* \* \*